Dec. 10, 1963 V. H. EARGLE 3,113,439
HEAT PUMP HAVING OUTDOOR TEMPERATURE COMPENSATING CONTROL
Filed Sept. 6, 1962

INVENTOR.
VERDE H. EARGLE
BY
HIS ATTORNEY

United States Patent Office 3,113,439
Patented Dec. 10, 1963

3,113,439
HEAT PUMP HAVING OUTDOOR TEMPERATURE
COMPENSATING CONTROL
Verde H. Eargle, Tyler, Tex., assignor to General Electric Company, a corporation of New York
Filed Sept. 6, 1962, Ser. No. 221,710
1 Claim. (Cl. 62—160)

The present invention relates to a heat pump adapted to heat or cool air from an enclosure and more particularly to an improved control arrangement for a heat pump having outdoor temperature compensating means adapted to provide biasing of the heat pump control means in anticipation of the heating and cooling requirements of the enclosure.

It is well known that, as the outdoor temperature increases or decreases rapidly, the normal indoor thermostat located within an enclosure usually lags behind the outdoor conditions and does not, therefore, properly control the comfort conditions within the enclosure. This is particularly troublesome when the enclosure is heated or cooled by heat pump apparatus, which utilizes an outdoor heat exchanger to absorb or dissipate heat into the outdoor air, because the outdoor air temperature also affects the heating or cooling capacity of the apparatus. That is, the outdoor temperature not only changes the heat flow through the walls of the enclosure, but also changes the capacity of the heat pump unit to satisfy the conditions within the enclosure.

It is, therefore, an object of the present invention to provide an improved temperature control arrangement for a heat pump apparatus in which the enclosure air temperature sensing member is automatically compensated according to the outdoor air temperature flowing through the outdoor heat exchange unit.

A more specific object of the present invention is to provide an improved thermostatic control arrangement for a heat pump adapted to heat or cool air from an enclosure in which the thermostat is supplied with a biasing heater, the output of which is inversely proportional to temperature of the air downstream from the outdoor heat exchanger.

Further objects and advantages of the invention will become apparent as the following description proceeds and the features of novelty which characterize the invention will be pointed out with particularity in the claims annexed to and forming a part of this specification.

In carrying out the objects of the present invention, there is provided a thermostat control for a heat pump including a biasing heater adapted to supply varying quantities of heat to the air surrounding the temperature sensing member of a thermostat thereby causing the member to sense a temperature somewhat higher than that actually existing in the enclosure, depending upon the amount of heat supplied by the heater. The heat output of the heater is controlled by a thermistor, having a resistance that is inversely related to the temperature to which it is exposed. The thermistor is connected in series with the biasing heater and located in the outdoor heat exchange unit of the heat pump at some point where it is exposed to the temperature of the outdoor air flowing through the outdoor unit. Thus, as the resistance of the thermistor increases, the biasing heat output of the resistor in series with the thermistor is reduced and, conversely, as the resistance of the thermistor decreases, the biasing heat output of the resistance heater increases.

For a better understanding of the invention reference may be had to the accompanying drawing in which.

Figure 1:
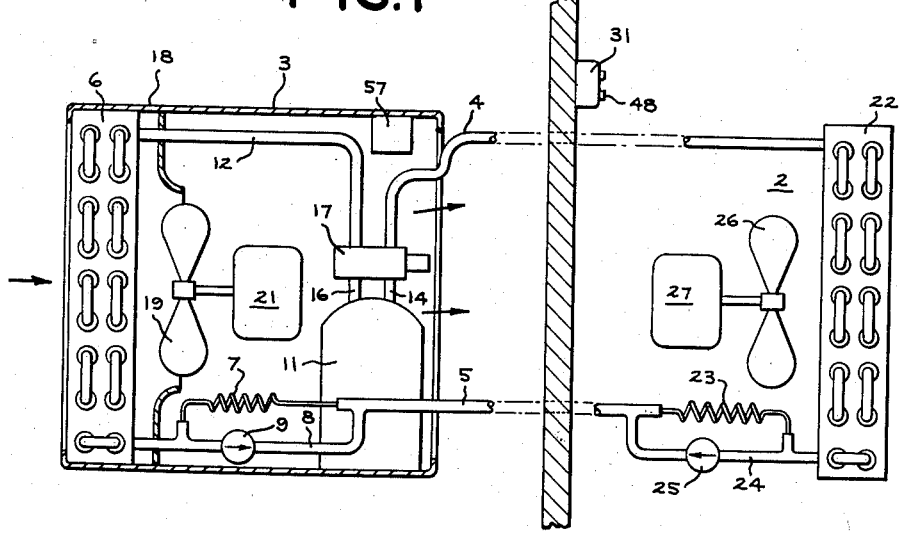
FIGURE 1 is a diagrammatic illustration of a reversible cycle refrigeration circuit showing the indoor and outdoor heat exchange units thereof.

Referring now to FIGURE 1, the heat pump of the present invention comprises an indoor heat exchange unit designated generally by the reference numeral 2, and an outdoor heat exchange unit, designated by the reference numeral 3. In the illustrated embodiment, the indoor and outdoor units are connected by suitable refrigerant tubing 4 and 5 connecting opposite sides of each of the units and forming a closed refrigerant circuit. The length of the tubing 4 and 5 is, of course, different for the various types of installations of heat pumps. The heat pump of FIGURE 1 is of the split system type requiring fairly long lengths of tubing 4 and 5 to connect the indoor and outdoor units. However, it will be understood that the present invention is also applicable to those types of heat pump arrangements in which the indoor and outdoor units thereof are both mounted in the same case with provisions made for ducting outdoor air through the outdoor heat exchange unit.

The outdoor heat exchange unit 3 comprises an outdoor heat exchanger 6, an outdoor capillary 7, or other flow control means such as the well-known thermally controlled expansion valve, and means for bypassing the refrigerant around the outdoor capillary 7 when the heat pump is operated as a cooling unit and the outdoor heat exchanger is being utilized as a condenser. In order to bypass refrigerant around the capillary 7, there is provided a bypass line 8 and a check valve 9, which permits flow of refrigerant through the bypass line 8 when refrigerant is flowing from the heat exchanger 6 toward the flow control means or capillary 7, or when the heat exchanger 6 is operated as a condenser. When the refrigerant is flowing from the indoor unit 2 in the direction toward the heat exchanger 6, the check valve 9 closes and all the refrigerant must flow through the capillary 7. The capillary 7 then expands the refrigerant from condenser pressure to evaporator pressure and the heat exchanger 6 is then operated as an evaporator.

The outdoor heat exchanger unit 3 also includes a compressor 11 having a suction line 14 and a discharge line 16 connecting respectively with a reversing valve 17. The reversing valve 17 connects the suction line 14 and the discharge line 16 with the remaining portions of the circuit so that the compressor withdraws refrigerant from either the outdoor heat exchanger 6 or from the indoor heat exchange unit and discharges the refrigerant into the other of the two heat exchangers. More specifically, the reversing valve 17 connects with the outdoor heat exchanger 6 by means of the conduit 12 and also connects with the refrigerant tube 4 leading to the indoor heat exchange unit. It should be noted that the outdoor heat exchange unit is mounted within a case 18 through which an outdoor air stream is circulated in heat exchange relationship with the components of the outdoor heat exchanger unit. Means, such as the fan 19, driven by the motor 21 are provided for circulating an outdoor air stream through the heat exchanger 6 and for circulating this air stream through the remaining portions of the case 18 back to the outdoors. As is well known in the heat pump art, the outdoor heat exchanger 6 absorbs heat from or dissipates heat into the outdoor air stream and the relative temperature of the outdoor air, therefore, plays an important part in determining the capacity of the apparatus to supply conditioning for the enclosure.

The indoor unit 2 comprises an indoor heat exchanger 22 and an indoor capillary or flow control means 23. As in the outdoor unit, a bypass means is provided for bypassing refrigerant around the capillary 23 when the heat pump is operating on the heating cycle or, more specifically, when the refrigerant flow is from the heat exchanger 22 toward the capillary 23. In the illustrated embodiment of the invention, the bypass means comprises the bypass tube 24 and a check valve 25 which stops the flow of refrigerant through the tube 24 when the refrigerant is flowing through tube 5 in the direction from the outdoor heat exchange unit 3, toward the indoor heat exchanger 22. It should be mentioned that capillary 23 is similar in operation to capillary 7 and that both capillaries 7 and 23 are sized to give optimum performance for the respective heating and cooling operations. That is, capillary 23 provides the restriction for the optimum performance of the refrigeration system under those conditions normally encountered during the cooling season and capillary 7 provides the restriction to give optimum performance of the refrigerating system under those conditions normally encountered during the heating season.

Indoor air is blown through the heat exchanger 22 for heat exchange purposes. Means such as the fan 26 and fan motor 27 are provided for circulating the indoor air from the enclosure over the heat exchanger 22. This air may be ducted from the enclosure to the heat exchanger 22 or, heat exchanger 22 may be directly exposed to the enclosure in any manner well-known in the art. The heat exchange unit 2 is shown without an enclosure or case inasmuch as the mounting arrangement for the heat exchange unit 2 is not absolutely essential for a full understanding of the present invention.

When the system is operated on the cooling cycle, the compressed refrigerant from the compressor 11 is directed by the reversing valve 17 into the outdoor heat exchanger 6 in which the refrigerant is condensed. Liquid refrigerant flows from the outdoor heat exchanger 6 through the bypass line 8 and into the conduit 5 which connects the outdoor unit with the indoor unit. Condensed refrigerant then flows through the indoor capillary 23 into the indoor heat exchanger 22, which functions as an evaporator. The refrigerant evaporates in the heat exchanger 22 thereby absorbing the heat from the air stream circulated through the heat exchanger 22 from the dwelling or other structure being conditioned.

When the apparatus is operated on the heating cycle, the compressed refrigerant from the compressor 11 is directed by the reversing valve 17 through the line or tube 4 into the heat exchanger 22, where the heat liberated during condensation of the refrigerant provides heat to the air being circulated through the heat exchanger 22. The condensed refrigerant from heat exchanger 22 then flows through the bypass conduit 24 into the refrigerant line 5 leading to the outdoor heat exchange unit 3. The refrigerant is expanded to evaporator pressure as it flows through capillary 7 whereupon it enters the outdoor heat exchanger 6 and absorbs heat from the outdoor air stream.

Figure 2:
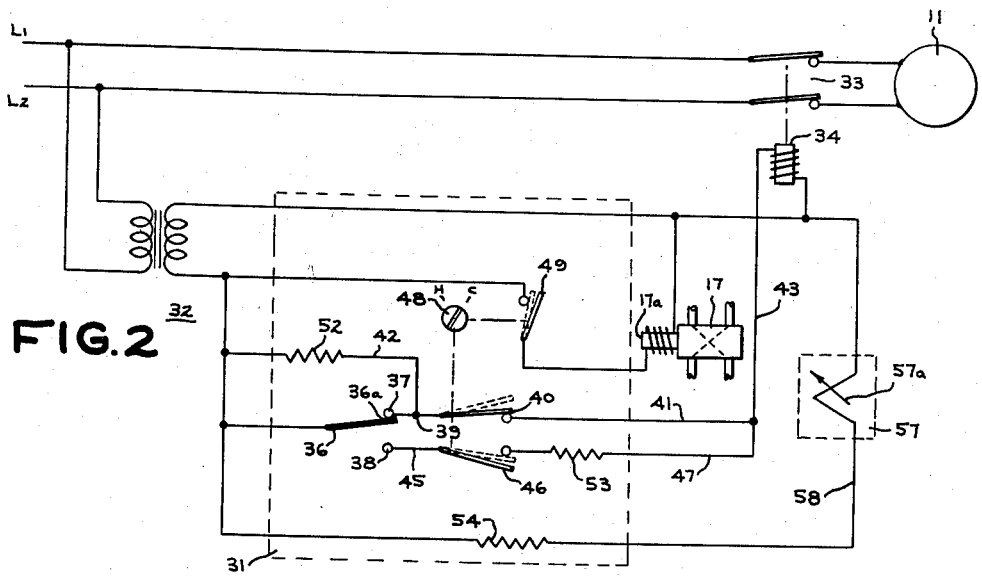
FIGURE 2 is a schematic diagram of a control circuit embodying the present invention.

Referring now to FIGURE 2 there is a shown a control arrangement for operating the above-described heat pump system to provide heating or cooling of the air within the enclosure. FIGURE 2 represents a circuit diagram in schematic form showing the various components of the present invention required to control the operation of the refrigeration system. Refrigeration control circuits for a heat pump system are usually much more complicated than that illustrated, but only those components necessary for a full understanding of the present invention are included in the circuit diagram. Those controls such as high-pressure cut-out switches and compressor overload controls are not included in the diagram inasmuch as they are not necessary for a full understanding of the invention.

The control circuit comprises a room thermostat which is represented by the reference numeral 31 and includes all of the elements within the dotted lines in FIGURE 2. As may be seen in FIGURE 1, the thermostat 31 is usually placed on an inner wall of the enclosure wherein it is exposed to the air from the enclosure and may be easily reached by the occupants thereof. Again referring to FIGURE 2, it may be seen that electrical power is supplied to the compressor 11 of the heat pump through the power lines L1 and L2. A suitable transformer 32 is provided for transforming the line power from the lines L1 and L2 to a low voltage power suitable for control circuit purposes. Obviously a line voltage type control could be utilized for this purpose but, in order to minimize the cost of the components of the control circuitry, it is more desirable to use a low voltage control circuit such as that illustrated in FIGURE 2. Control power is taken from the transformer 32 and supplied to the various components of the control circuit including the thermostat and other control components located within the thermostat box 31.

The thermostat 31 may be any of the well-known types adapted to energize a switch during temperature increases within the enclosure and to energize a second switch for a different control circuit 14 according to temperature decreases within an enclosure. Thermostats of this general type are well-known in the art and have been used in the past to control heating and cooling apparatus and a further description thereof is not believed necessary for a full understanding of the invention.

In the circuit shown in FIGURE 2, it will be observed that power flow through the lines L1 and L2 is controlled by a gang switch 33, operated by a relay or solenoid 34 which, in turn, causes the gang switch 33 to open when the solenoid 34 is de-energized and to close when the solenoid or relay 34 is energized. In order to energize the solenoid 34 according to temperature rises within the enclosure or according to temperature decreases within the enclosure, the thermostat 31 is provided with a temperature sensing member such as the bimetal switch member 36. Switch member 36 is adapted to operate a pair of switches, one of which energizes the solenoid 34 upon temperature increases within the enclosure and the other of which energizes the solenoid 34 upon temperature decreases within the enclosure. Specifically, in the arrangement illustrated in FIGURE 2, the blade 36a of the bimetal sensing member 36 engages the contact 37 to energize a first circuit during the temperature rises within the enclosure and engages the contact 38 to energize a second circuit during temperature decreases within the enclosure. It will be understood that another type of temperature sensing device could be utilized for this purpose, such as a bellows or temperature sensing bulb and bellows arrangement containing an expansible fluid. When the blade 36a engages the cooling contact 37, control current is carried through the line 39, switch 40, and line 41 which is connected in series with the solenoid 34 through the line 43. Thus, when the temperature rises above a predetermined temperature, which may be selected by the occupant of the enclosure for the thermostat, the blade 36a engages the contact 37 energizing the solenoid 34 thereby closing the switches 33 and causing the compressor 11 to circulate refrigerant through the refrigeration system.

When the unit is operated on the heating cycle and the temperature within the enclosure drops below a predetermined temperature as may be selected by the setting of the thermostat, the blade 36a engages the contact 38 thereby energizing a second circuit including the line 45, switch 46 and line 47, which connects with the conduit 43 to supply current to the solenoid 34, thereby energizing the solenoid to close switches 33 and thereby operate the compressor 11.

As may be seen in FIGURE 2, the particular type of operation desired for the heat pump may be selected through a control means or control knob 48 on the front of the thermostat. The control knob 48 may be moved to two different positions to operate a pluarlity of gang of switches designed to properly energize the solenoid valve 17 to provide the correct directional flow of refrigerant through the system for the particular type of operation desired. In the illustrated embodiment, these switches also control certain portions of the thermostat device to provide anticipating heat to the device during the cooling or heating operation. More specifically, the control knob 48, when turned to the cool, or C position shown in FIGURE 2, opens a switch 49 in the control circuit adapted to energize the solenoid 17a of the solenoid valve 17. With this solenoid control switch 49 open, solenoid valve 17 is de-energized and directs compressed refrigerant toward the outdoor heat exchanger 6 through the line 12 as heretofore described. Knob 48 also operates switch 40, and switch 46 to adjust the thermostat circuitry for proper control of the air conditioning components during operation thereof on the heating or cooling cycles. More specifically switch 40 is closed and switch 46 is open when the knob is positioned in its C position for cooling operation, as shown in FIGURE 2. A cooling cycle anticipating heater 52 adds small quantities of heat to the area surrounding the bimetal member 36 whenever the switch blade 40 is closed and the bimetal blade is not touching contact 37. Thus, the resistor 52 continuously adds heat to the circuitry during temperature rises in the enclosure to make the temperature sensing member 36 sense an air temperature slightly above that of the enclosure and thereby cause the blade 36a to close sooner than would normally be expected on the cooling operation. Once the blade 36a closes or engages contact 37 most of the current flow through the control thermostat passes through the bimetal blade and shunts the resistance heater 52 thereby reducing the heat output of the heater 52. The above described operation of anticipating heater 52 causes the thermostat to energize the compressor more quickly as the temperature rises within the enclosure and, since the heat output of the heater 52 is removed once the blade 36a closes against contact 37, this causes energization of the compressor for a shorter length of time as the enclosure begins to cool. Because switch 40 is closed and switch 46 is open, it will be noted that the blade 36a can only energize the solenoid 34 through the cooling circuit and will not operate the switches 33 when the temperature of the enclosure drops.

When the control knob 48 is moved into the heating position or so that it is directed toward the H portion of the control, all of the switches are then moved to their dotted line position as shown in FIGURE 2. Thus switch 40 is open while switches 46 and 49 are closed. The closing of switch 49 energizes the solenoid 17a of the valve 17 thereby causing the reversing valve 17 to reverse the direction of flow through the heat pump system and directs refrigerant through the line 4 toward the indoor heat exchange unit as heretofore explained. Thus the indoor heat exchange unit operates as a condenser while the outdoor heat exchange unit operates as an evaporator to absorb heat from the air flowing thereover. Switch 40 is then open thereby eliminating the possibility of undesired operation of the compressor when the temperature of the enclosure rises above a predetermined temperature on the heating cycle operation. Opening of switch 40 also removes the cooling anticipating heater 52 from the circuitry thus removing this heat during heating cycle operation. Switch 46 is closed thereby permitting the bimetal blade 36a to energize the solenoid 34 according to temperature decreases within the enclosure during the heating operation. Thus, as the temperature falls below a predetermined temperature and the bimetal blade 36a engages the contact 38, current is carried through the heating circuit and the heating anticipator 53 to energize the solenoid 34 connecting the power to the compressor. The series connected heating anticipator 53 then supplies heat to the thermostat tending to cause the thermostat to interrupt the heating cycle or second circuit when the temperature of the enclosure approaches that predetermined temperature desired by the occupants. The heat supplied by the heating anticipator 53 tends to cause the thermostat to sense a temperature somewhat greater than that of the enclosure during operation of the heat pump thereby causing the thermostat to de-energize the compressor sooner as the enclosure temperature rises. However, since the anticipating heater 53 is removed from the circuit as the thermostat blade disengages contact or switch 38, it will permit the energization of the second circuit very quickly as the enclosure temperature falls.

Providing heat anticipation through anticipating heaters such as 52 and 53 or false heat for temperature control devices to lower the apparent differential of operation of the control device is well known in the art. These devices eliminate the over-shoot normally occurring in the temperature control of heating and cooling systems.

As previously pointed out, wide variations in the outdoor temperature have a tendency to greatly affect the operation of a heat pump type cooling and heating system. That is, as the outdoor temperature varies it not only changes the heat flow through the walls of the enclosure, it also greatly affects the heat exchange availability at the outdoor heat exchanger to greatly vary the capacity of the heat pump apparatus. Thus, the normal type of thermostat designed to provide heating or cooling of an enclosure according to the air temperature within the enclosure sometimes does not provide proper comfort conditions when the outdoor temperature varies to any great extent.

In order to give a more precise control of the comfort conditions within an enclosure by means of a heat pump, the present invention provides a third anticipating or biasing heater 54 which is supplied with power through the low voltage control circuit and is connected in series with a thermistor 57 through the line 58. Thermistor 57 is disposed in the outdoor heat exchange unit 3 in the air stream flowing through this unit. In the preferred arrangement, as may be seen in FIGURE 1, the thermistor 57 is located on the downstream side of the unit at a point where the flow of air through the case 18 passes over the thermistor prior to being discharged out of the unit. The air flowing over the thermistor is, in the preferred arrangement, at a temperature substantially above or below that of the outdoor ambient because the air has previously passed in heat exchange relationship with the heat exchanger 6, which may be hotter than the ambient or colder than the ambient depending upon whether the heat exchanger is operating as a condenser or as an evaporator.

Figure 3:
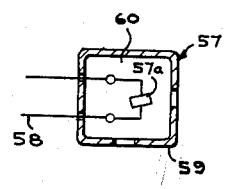
FIGURE 3 is a view of a thermistor resistance member within a suitable case for mounting according to the present invention.

Referring to FIGURE 3, it will be seen that the thermistor 57 includes a thermistor resistance member 57a mounted on a terminal board 60 inside a case 59. Thermistor 57 is a resistance member having a coefficient of resistance that is inversely related to the heat applied thereto. That is, as the temperature of the thermistor goes up, its resistance goes down. Thermistors of this type are well known in the art and a further description thereof is not believed necessary for a full understanding of the invention except to point out that the thermistor 57 provides a voltage drop, related to the outdoor temperature, in the control circuitry leading to the anticipating heater 54. Thus, when the temperature of the outdoor air passing over the thermistor 57 is high, the resistance and voltage drop of the thermistor is relatively low, and the current flow through the heater 54 is relatively great thereby creating a substantial heat output to bias the thermostat sensing member 36. Conversely, when the temperature of the outdoor air flowing over the thermistor 57 is low and the resistance and voltage drop in the thermistor is relatively high, then the current flow through the circuit is low and heat output of the heater 54 is relatively low creating proportionately less bias to the thermostat sensing member 36.

During the cooling season, depending upon the cooling load of the enclosure and temperature of the outdoor ambient, it is not unusual for the outdoor heat exchanger to operate at temperatures ranging between 70° F. to 160° F. It has been found however that, as the outdoor air temperature rises, the condenser temperature rises disproportionately therewith. For example, for a 10° F. rise in outdoor temperature, the condenser temperature might rise 18° to 20° F. Therefore, the resultant change in air temperature in the downstream portions of the case, after the air has passed through the heat exchanger 6, is always much greater than the change in the temperature of the outdoor ambient during wide ranges of outdoor temperature variation. By placing the thermistor 57 in a position to sense the temperature of the air stream after it has passed through the heat exchanger 6, it is possible to quickly anticipate variations in the temperature of the outdoor ambient. The wide range of resistance change at the thermistor 57 greatly varies the output of the anticipating heater 54 and the thermostat compensates very rapidly during changes in the outdoor temperature to make the heat pump apparatus provide more uniform comfort conditions. Thus, when the outdoor temperature rises, there is a tendency for the anticipating heater or thermostat to energize the cooling unit even though the indoor temperatures may be such as to not require cooling at that particular moment. The thermistor 57 reflects the sudden rise in temperature and foresees the more rapid heat transfer through the walls of the enclosure and causes the apparatus to turn on more quickly thereby maintaining the comfort conditions within the enclosure at a relatively stable temperature.

The same is true of rapidly falling outdoor temperatures. When the outdoor temperature falls and the resistance of the thermistor 57 goes up, the anticipating heat supplied by the resistor 54 reduces substantially and causes blade 36a of the sensing member 36 to deenergize the cooling control circuit and interrupt the power to the compressor thereby tending to more quickly reduce the cooling output of the apparatus to maintain more stable enclosure temperatures.

During operation of the heat pump on the heating cycle, the outdoor heat exchanger is operated as an evaporator and the outdoor air passing through the heat exchanger becomes very cold. The thermistor 57 is exposed to this cold air temperature and its resistance becomes very great thereby reducing the current flow through the circuit to reduce the heat output from the anticipating heater 54. The thermostat or thermal sensing member 36 then senses a temperature lower than would be the result if there were a greater heat output from the anticipating heater 54 and causes the blade 36a to more quickly engage the heating control contact 38 thus energizing the unit for heating operation. When the outdoor temperature rises and the heating load of the enclosure reduces, the temperature of the air stream flowing from the outdoor heat exchange unit also rises so that the resistance of the thermistor reduces substantially thereby permitting a greater current flow through the anticipator circuit. More heat is then supplied by the anticipating heater 54 to the thermostat thereby tending to cause the blade 36a to disengage its contact 38 and thereby interrupting the heating cycle more quickly to maintain uniform comfort conditions.

The placing of the thermistor 57 within the outdoor heat exchange section of the heat pump tends to create a very much greater and more accurate control than could be applied by merely placing the thermistor 57 in the outdoor ambient inasmuch as the temperature of the air flowing over the thermistor from the heat exchange unit is proportionate to some extent to the capacity or to the amount of heating or cooling that is available at a particular moment by means of the heat pump. Thus, during the heating cycle when the temperature is very very low, this is an indication that there is very little possible heat available from the air stream and that the unit should operate for a greater length of time. Conversely on the cooling cycle as the outdoor temperature rises to a great extent the temperature within the case will be relatively high thus indicating that heat transfer between the outdoor heat exchange unit 6 and the outdoor air is not as great as normal and thus necessitating a longer or greater operating cycle for the heat pump in order to satisfy indoor cooling requirements. Thus, it will be seen that the placement of the thermistor within the outdoor case not only senses the outdoor temperature but senses the relative ability of the outdoor heat exchange unit to dissipate or absorb heat from the outdoor air.

While there has been described what at present is considered to be the preferred embodiment of the invention it will be apparent to one skilled in the art that some changes and modifications may be made therein without departing from the invention and it is, therefore, the aim of the appended claim to cover all such changes and modifications as fall within the true spirit and scope of the invention.

What I claim as new and desire to secure by Letters Patent of the United States is:

A control arrangement for a heat pump system adapted to heat or cool air within an enclosure and comprising a reversible refrigeration system including a compressor, an indoor heat exchanger and an outdoor heat exchanger connected in reversible refrigerant flow relationship, means for circulating a stream of enclosure air through said indoor heat exchanger and a stream of outdoor air through said outdoor heat exchanger and means for selectively reversing the flow of refrigerant through said system thereby to heat or cool said enclosure air stream flowing through said indoor heat exchanger; said control arrangement comprising a temperature responsive member responsive to the temperature of the air within said enclosure and movable in one direction as the temperature of said enclosure air increases and movable in a reverse direction as the temperature of said enclosure air decreases, first switch means operated by said temperature responsive member to energize said refrigeration system to cool said enclosure as the temperature of said enclosure air rises above a predetermined high temperature and a second switch means operated by said temperature responsive member to energize said refrigeration system to heat said enclosure as the temperature of said enclosure air falls below a predetermined low temperature, a biasing heater in heating relation with said temperature responsive member for biasing said member in a direction tending to close said first switch means and to open said second switch means, and a thermistor disposed in the path of said outdoor air stream downstream from said outdoor exchange unit and responsive to the temperature of the outdoor air stream after it has passed through said outdoor heat exchanger, said thermistor being electrically connected in series circuit with said biasing heater and having a resistance that varies inversely with the temperature of said thermistor whereby it decreases the current flow through said circuit as the temperature of said outdoor air stream flowing from said outdoor heat exchanger falls thereby decreasing the quantity of heat output of said biasing heater and increases the current flow through said circuit as the temperature of said outdoor air stream flowing from said outdoor heat exchanger rises thereby increasing the heat output of said biasing heater.

References Cited in the file of this patent

UNITED STATES PATENTS

| | | |
|---|---|---|
| 2,183,874 | Shivers | Dec. 19, 1939 |
| 2,728,197 | Ellenberger | Dec. 27, 1955 |
| 2,732,132 | Hulett | Jan. 24, 1956 |